UNITED STATES PATENT OFFICE.

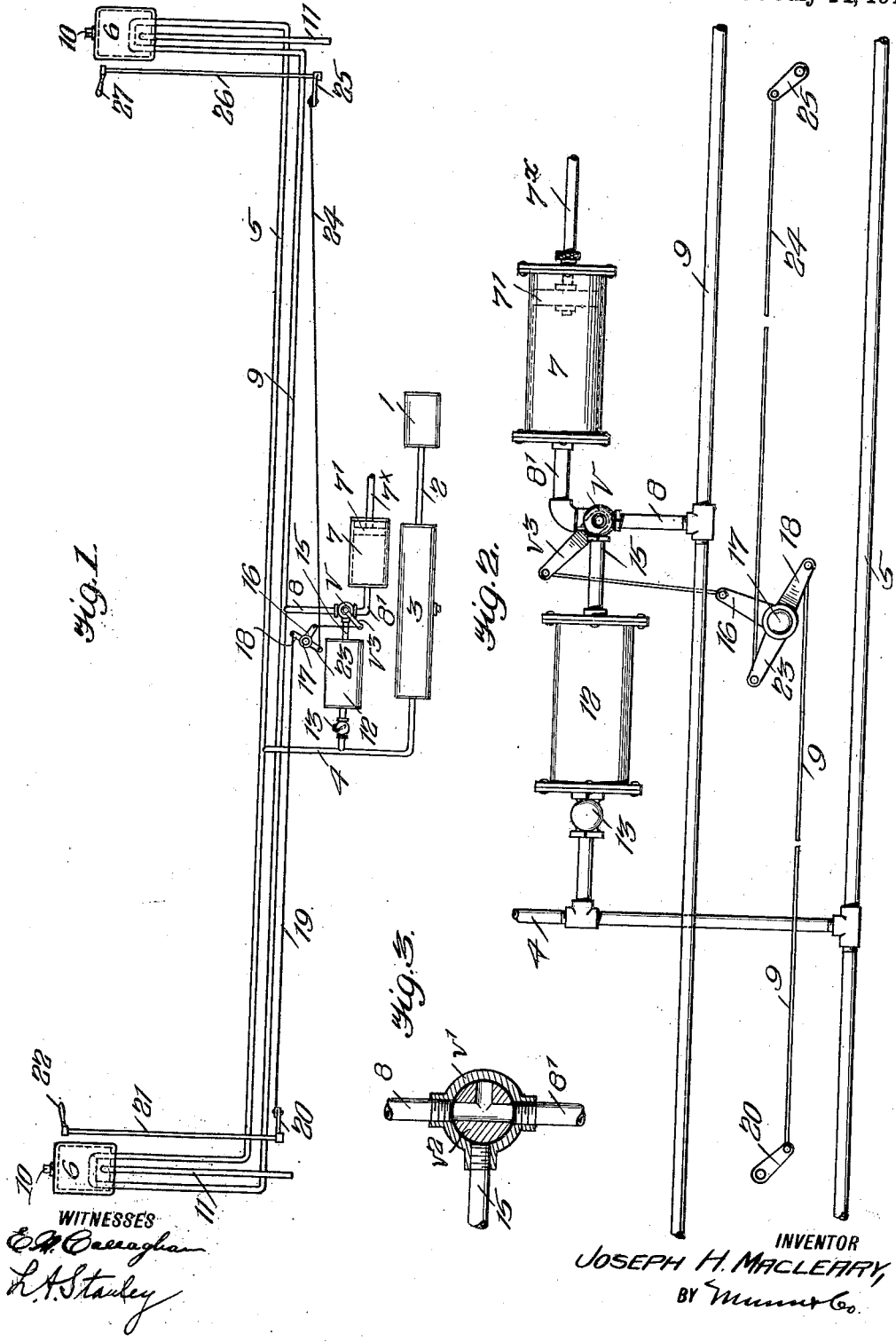

JOSEPH H. MACLEARY, OF WILMINGTON, DELAWARE.

EMERGENCY-AIR-BRAKE DEVICE.

1,103,790.   Specification of Letters Patent.   Patented July 14, 1914.

Application filed February 20, 1914. Serial No. 819,953.

*To all whom it may concern:*

Be it known that I, JOSEPH H. MAC-LEARY, a citizen of the United States, and a resident of Wilmington, in the county of Newcastle and State of Delaware, have made certain new and useful Improvements in Emergency-Air-Brake Devices, of which the following is a specification.

My invention relates to emergency braking devices for use on street cars and the like, and it consists in the combinations, constructions, and arrangements herein described and claimed.

An object of my invention is to provide a device by means of which the car may be controlled even if an accident should happen to the main reservoir or the line leading therefrom, or even to the pump which supplies the main reservoir.

A further object of my invention is to provide a simple device comprising an auxiliary air reservoir in which the air may be stored under pressure, and which ordinarily is not in communication with the brake cylinder, but which may be brought into communication with the brake cylinder should occasion arise.

A further object of my invention is to provide an emergency braking device which may be readily applied to existing systems without necessitating any substantial change in the system.

Other objects and advantages will appear in the following specification and the novel features of the device will be particularly pointed out in the appended claim.

My invention is illustrated in the accompanying drawings forming part of this application in which—

Figure 1 is a diagrammatic view showing the arrangement of the various parts of the apparatus, Fig. 2 is a bottom plan view of a portion of the apparatus as applied to a car, and Fig. 3 is a section through a three-way valve which may be advantageously used in this system.

Referring now to Fig. 1 I have shown therein diagrammatically, a compressor 1 which is connected by a pipe 2 with the main air reservoir 3. The latter is connected by a pipe 4 with the reservoir pipe line 5. The line 5 extends toward each end of the car and into the valve casings 6.

The brake cylinder is shown at 7, the piston 7' being connected by means of a stem or push rod 7× with the brake mechanism (not shown). The brake cylinder 7 is connected by means of pipes 8 and 8' with a pipe 9, which also leads into the valve casings 6, and which may be connected with the reservoir pipe 5 in the usual manner by turning the valve stem 10 of the valve. Each valve casing 6 is provided with an exhaust pipe 11. The structure described thus far is of the ordinary type.

In connection with the apparatus mentioned I make use of an auxiliary pressure reservoir 12, which communicates with the pipe 4, a check valve 13 being interposed between the pipe 4 and the reservoir 12. The opposite end of the reservoir is adapted to communicate with the brake cylinder 7 through a valve which I have denoted in general by V. This valve is preferably of the so-called three-way type, which is illustrated in Fig. 3. In this figure the valve casing $v'$ has three pipes 8, 8' and 15 communicating with the interior thereof. When the valve $v^2$ is in the position shown in Fig. 3 the brake cylinder communicates with the pipe line 9, through the pipes 8' and 8 and the valve may be turned to establish communication with the pipes 15 and 8', thus putting the emergency reservoir 12 into direct communication with the brake cylinder. In order to effect this I provide a valve handle $v^3$ which is connected with the central arm 16 of a lever pivotally mounted at 17. The arm 18 of the lever is connected by means of a rod or cable 19 with an arm 20 at the end of an operating rod 21, which is provided with a handle 22. The arm 23 of the lever is connected by a rod or cable 24 to an arm 25 on an operating rod 26 which is provided with a handle 27.

From the foregoing description of the various parts of the device the operation thereof may be readily understood. In the normal operation of the device the compressor 1 will force air into the main reservoir 3, and thence into the pipe line 5. The normal position of the valve V is that shown in Fig. 3 in which the brake cylinder 7 is in communication with the pipe 9. As the pressure rises in the main reservoir part of the air will be forced past the check valve 13 and into the auxiliary reservoir 12 where it will remain under pressure. In operating the brakes the motorman turns the valve stem 10 so as to establish communication between the pipes 5 and 9. A pressure will therefore flow from the main reservoir through the pipe 5 into the pipe 9 and thence by way of pipes 8 and 8' into the brake cylinder, applying the brakes. When the motorman desires to release the brakes he turns the valve stem 10, so as to connect the pipe 9 with the exhaust pipe 11, whereupon the pressure in the brake cylinder is relieved through the exhaust pipe 11 and the brakes are released. If now an accident should occur either to the reservoir 3 or to the pipes leading therefrom so that the pressure should go down, the brakes could still be operated by the pressure from the auxiliary reservoir 12. This may be effected by turning either the handles 22 or 27 at opposite ends of the car, thus moving the three-way valve V so as to connect the brake cylinder directly with the auxiliary cylinder 12. The brakes may be released by turning these handles 22 or 27 in the opposite direction and connecting the pipe 9 with the exhaust 11 through the movement of the valve stem 10.

It will thus be seen that I have provided a simple device which may be incorporated with the ordinary brake system without interfering with the operation of the latter. It is obvious that the auxiliary reservoir 12 may be made of any suitable size. In Fig. 1 the view is purely diagrammatical and the auxiliary reservoir may be of larger size than that shown without departing from the spirit of the invention.

I claim:

In an air brake mechanism for street cars, a main air reservoir, a reservoir pipe line connected therewith, a brake cylinder, a brake cylinder pipe, connections between said brake cylinder and said brake cylinder pipe, said connections including a three way valve, a pair of exhaust pipes, means for connecting said brake cylinder pipe with said reservoir pipe line or with either of said exhaust pipes, an auxiliary pressure reservoir, connections between said auxiliary pressure reservoir and said main air reservoir on one side, said last named connections including a check valve, connections between said auxiliary reservoir and said three-way valve on the other side, and means including separate operating handles at each end of the car for turning the three-way valve so as to establish communication between said auxiliary pressure reservoir and said brake cylinder or said brake cylinder and said brake cylinder pipe.

JOSEPH H. MACLEARY.

Witnesses:
SOLON C. KEMON,
PERRY B. TURPIN.

Copies of this patent may be obtained for five cents each, by addressing the "Commissioner of Patents, Washington, D. C."